un10693793B2

United States Patent
Bernoth et al.

(10) Patent No.: US 10,693,793 B2
(45) Date of Patent: Jun. 23, 2020

(54) MITIGATING NETWORK SATURATION FOLLOWING PERIODS OF DEVICE DISCONNECTION AND SUBSEQUENT RECONNECTION

(71) Applicant: International Business Machines Corporation, Armonk, NY (US)

(72) Inventors: Andrew J. Bernoth, Lara (AU); Adam Eberbach, Surrey Hills (AU); Timothy M. Lynar, Melbourne (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 101 days.

(21) Appl. No.: 16/128,850

(22) Filed: Sep. 12, 2018

(65) Prior Publication Data
US 2020/0084151 A1   Mar. 12, 2020

(51) Int. Cl.
| | |
|---|---|
| *H05H 1/24* | (2006.01) |
| *H04L 12/801* | (2013.01) |
| *H04L 12/859* | (2013.01) |
| *G06N 20/00* | (2019.01) |
| *H04L 12/24* | (2006.01) |
| *H04L 12/26* | (2006.01) |

(52) U.S. Cl.
CPC ............ *H04L 47/19* (2013.01); *G06N 20/00* (2019.01); *H04L 47/2475* (2013.01); *H04L 41/22* (2013.01); *H04L 41/5029* (2013.01); *H04L 43/065* (2013.01); *H04L 47/14* (2013.01)

(58) Field of Classification Search
CPC . H04L 47/19; H04L 47/2475; H04L 41/5029; H04L 47/14; H04L 41/22; H04L 43/065; G06N 20/00
See application file for complete search history.

(56) References Cited

U.S. PATENT DOCUMENTS

| | | | |
|---|---|---|---|
| 7,409,586 B1 * | 8/2008 | Bezbaruah | G06F 11/0727 714/13 |
| 7,493,407 B2 | 2/2009 | Leedom et al. | |
| 8,363,672 B2 | 1/2013 | Ben-Haim et al. | |
| 10,003,548 B2 * | 6/2018 | Lee | H04L 47/787 |

(Continued)

*Primary Examiner* — Philip J Chea
*Assistant Examiner* — Wuji Chen
(74) *Attorney, Agent, or Firm* — Garg Law Firm, PLLC; Rakesh Garg; Brian Restauro

(57) ABSTRACT

Mitigating network saturation includes detecting reconnection of device to a network after a period of disconnection. A set of applications residing on the device is queried for estimated data associated with the application awaiting transfer. A response is received from a first application of the set of applications including a first estimated data awaiting transfer from the first application. Responsive to determining that a response has not been received from a second application, a second estimated data awaiting transfer from the second application is determined based upon a learned data usage model for the application. A total expected data transfer amount is determined based upon the first estimated data and the second estimated data. Responsive to the determining that the total expected data transfer amount is not less than a threshold value, A priority of the data transfer for the first application and the second application is determined.

20 Claims, 5 Drawing Sheets

(56) References Cited

U.S. PATENT DOCUMENTS

| | | | |
|---|---|---|---|
| 2005/0213504 A1* | 9/2005 | Enomoto | H04L 41/142 370/235 |
| 2008/0140767 A1* | 6/2008 | Rao | H04L 65/1013 709/203 |
| 2009/0285201 A1* | 11/2009 | Ben-Haim | H04L 12/66 370/352 |
| 2012/0092991 A1* | 4/2012 | Jeong | H04L 47/25 370/235 |
| 2012/0117478 A1* | 5/2012 | Vadde | G06F 9/54 715/736 |
| 2013/0198373 A1 | 8/2013 | Zalmanovitch et al. | |
| 2014/0241275 A1* | 8/2014 | Edara | H04W 28/0236 370/329 |
| 2016/0007233 A1 | 7/2016 | Rao et al. | |
| 2017/0053129 A1* | 2/2017 | Arif | G06F 3/0482 |
| 2017/0164291 A1* | 6/2017 | Ludwig | H04W 4/80 |
| 2017/0237675 A1* | 8/2017 | Srinivasan | H04L 47/56 370/413 |
| 2017/0359131 A1* | 12/2017 | Mashimo | H04L 69/14 |
| 2018/0077081 A1* | 3/2018 | Lauer | H04L 47/50 |
| 2019/0073811 A1* | 3/2019 | Shah | G06K 9/00751 |

* cited by examiner

MITIGATING NETWORK SATURATION FOLLOWING PERIODS OF DEVICE DISCONNECTION AND SUBSEQUENT RECONNECTION

TECHNICAL FIELD

The present invention relates generally to a method, system, and computer program product for avoiding network saturation. More particularly, the present invention relates to a method, system, and computer program product for mitigating network saturation following periods of device disconnection and subsequent reconnection.

BACKGROUND

Network congestion following disconnection of a mobile device from a network and subsequent reconnection to the same or a different network is a particular problem for users whose location changes, especially when travelling internationally. Ground-based networks do not move typically move but a user's mobile device moves with the user as the user travels. In such situations, the network connection may change from an essentially free wireless connection in a home or office, to a modestly priced 4G connection when moving outside of the home or office, to a lower performance 3G network in areas of lesser coverage. The network connection may fail completely in some areas or become a very expensive such as due to an international data roaming service in which network providers may take advantage of a user having no other network options in order to charge an exorbitant price per small unit of data transferred. In this last case, many users voluntarily disconnect from the network completely, sometimes for many days, if the user is unable to obtain a more economical network connection.

When applications associated with a mobile device disconnect from a network for some period of time they may, through production of local data or accumulation of data on a server to which they may connect, have a substantial backlog of data to transfer before normal levels of operation resume. Reconnection of the device to the network may result in very large volumes of data being transferred as each application begins to catch up to what has happened on the network. As a result, substantial network congestion of the connection may occur due to saturation of the connection.

SUMMARY

The illustrative embodiments provide a method, system, and computer program product. An embodiment of a method includes detecting, by one or more processors, reconnection of device to a network after a period of disconnection, and querying, by one or more processors, a set of applications residing on the device for estimated data associated with the application awaiting transfer. The embodiment further includes determining, by one or more processors, that a response has been received from a first application of the set of applications. In the embodiment, the response includes a first estimated data awaiting transfer from the first application. The embodiment further includes determining, by one or more processors, that a response has not been received from a second application of the set of applications. The embodiment further includes determining, by one or more processors, responsive to determining that the response has not been received from the second application, a second estimated data awaiting transfer from the second application based upon a learned data usage model for the application.

The embodiment further includes determining, by one or more processors, a total expected data transfer amount based upon the first estimated data and the second estimated data, and determining that the total expected data transfer amount is not less than a threshold value. The embodiment further includes determining, by one or more processors, responsive to the determining that the total expected data transfer amount is not less than the threshold value, a priority of the data transfer for the first application and the second application.

Another embodiment further includes receiving, by one or more processors, a priority indication from a user of the device designating a priority for at least one of the first application or the second application. In another embodiment, the determining of the priority of the data transfer for the first application and the second application is based upon the priority indication from the user.

Another embodiment further includes transferring, by one or more processors, the application data for the first application and the second application based upon the priority. In another embodiment, the learned data usage model for the application is previously trained using data usage pattern statistics for the second application. In another embodiment, the total expected data transfer amount is based upon a summation of the first estimated data and the second estimated data.

Another embodiment further includes presenting, by one or more processors, the set of applications to the user in a list within a graphical user interface, wherein the priority indication is received from the user via the graphical user interface. In another embodiment, the threshold value is received form the user.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
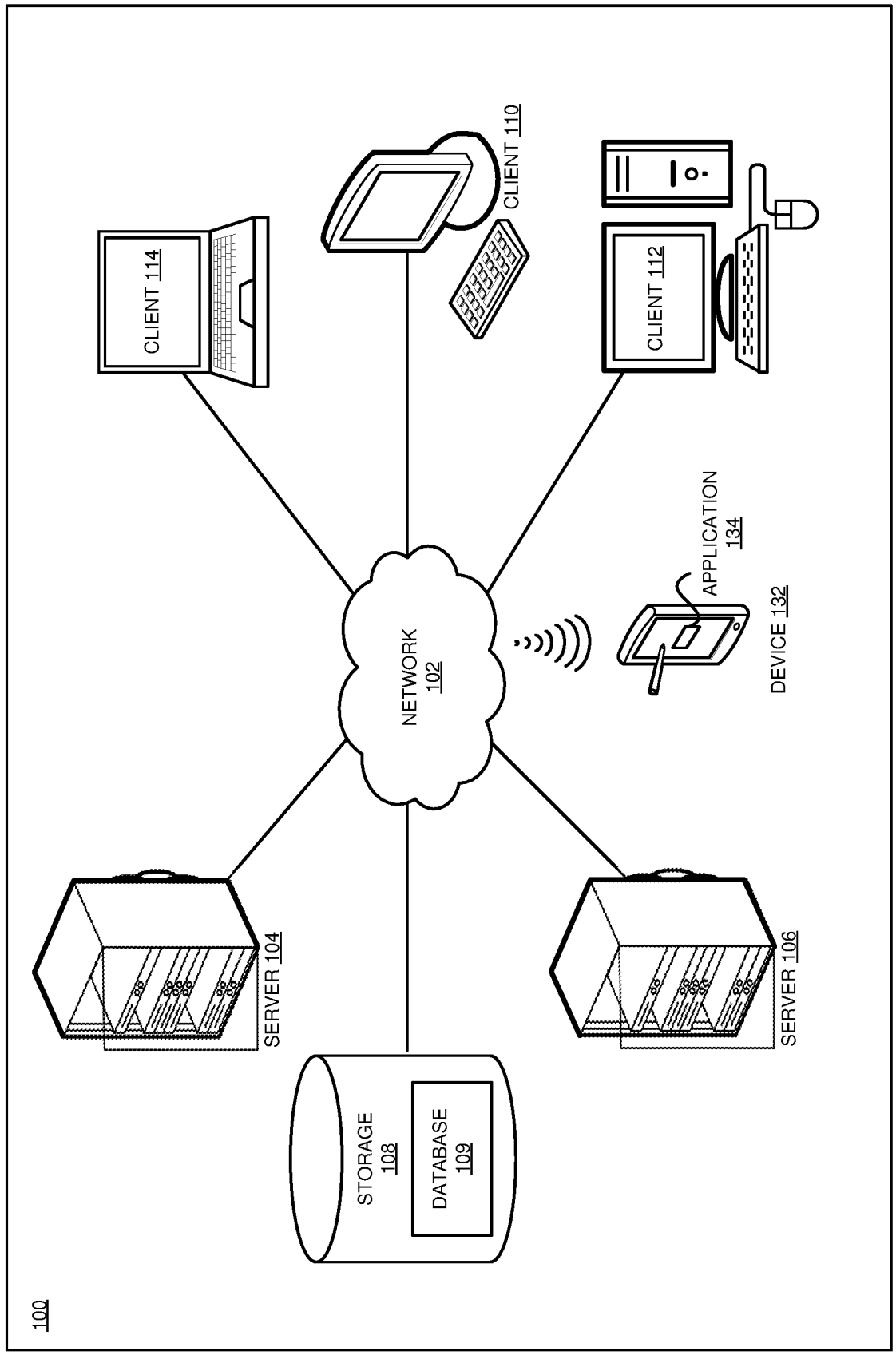
FIG. 1 depicts a block diagram of a network of data processing systems in which illustrative embodiments may be implemented.

The illustrative embodiments described herein are directed to mitigating network saturation following periods of device disconnection and subsequent reconnection. One or more embodiments recognize that an existing problem is when a device disconnects from a network for a period of time, applications running on the network may accumulate a substantial backlog of data to either transfer to the network or receive from the network until such time as when a reconnection is established. Reconnection of the device to the network may result in very large volumes of data being transferred as each application begins to transfer backlogged data over the network connection resulting in saturation of the network connection.

If a user particularly desires one kind of connection, such as receiving a map to complete immediately, the user may be frustrated by all of the other applications on the device simultaneously competing for network bandwidth so that the transactions the user cares about at that time take too long. Additionally, when a user connects after a period of disconnection the user may choose to use a particularly expensive type of connection that the user may voluntarily turned off to avoid high data charges. If the need for receiving a particular map or message is important enough to incur the costs associated with the transfer of that data, the user should be able to transfer only that data, and not for example, be forced to pay for a large amount of email, social messaging and other data that the user considers not worth paying a high fee to receive.

One or more embodiments are directed to a process in which an operating system of a device detects a period of disconnection and then allows the user to select applications for which data transfer is of particular importance. In an embodiment, the process takes into account established usage patterns of data transfer and learns application usage pattern behavior over time. In the embodiment, the process establishes a procedure for the operating system to query individual applications for an estimated backlog of data to be transferred upon reconnection. In the embodiment, if a response from a particular application is unavailable or not believable, the process may use its own learned patterns as an estimate of the data to be transferred for the particular application using machine learning. One or more embodiments allows a user to select which applications are more important and to prioritize transfer of the selected applications data upon reconnection. One or more embodiments provide for recovery of the operating system into a condition of normal network operation. One or more embodiment may provide additional benefits including the ability to detect abnormal patterns of network usage.

In one or more embodiments, to avoid the problem of a device becoming unresponsive, network operations that are particularly desired to be completed quickly take a lower priority to other traffic for which immediate transfer of data is not a concern. Applications typically participate in a network to transfer data through a series of software abstractions, usually exposed as a fairly high level interface provided by the operating system such as the URLSession class in iOS™ developed by Apple Inc. In one or more embodiments, control over whether the network appears to be connected or disconnected to any application is controlled by an operating system application. In one or more embodiments, the operating system application may report network status differently to different applications as required. Additionally the operating system application may gather statistical information about the volume of traffic transferred by an application for a given period, establishing expected patterns of usage over time.

In an embodiment, a device detects through timestamp that a connection to a network is being re-established. In the embodiment, after a threshold period of time, the device initiates a case-by-case re-connection scenario for the application waiting to transfer data. In this scenario, the operating system application may enter an establishment phase during which it queries each application which is capable of responding to the query with an estimate of how much data is queued to transfer immediately. If an application does not respond, returns unbelievable answers, or cannot calculate the estimate for some reason, the operating system application may use its own patterns of learned data transfer behavior to estimate the data requirements of each application on re-connection. On collecting responses from one or more applications, the operating system application may choose not to offer any prioritization of application data transfer if the total expected amount of data to transfer is below a certain volume threshold. In particular embodiments, the thresholds may be set by the user or by operating system default values.

If the total estimated data transfers do exceed a threshold, in one or more embodiments the operating system is configured to present one or more of the applications to the user with an indication of importance of the application, and place the one or more applications in a transfer queue according to a relative priority of each application. In particular embodiments, the operating system application presents the applications to the user in a list. In particular embodiments, the user may choose to bypass these controls completely and avoid any network controls by the operating system, or the user may alter the relative priority of each application. In particular embodiments, a user may also choose to grant or deny connection to applications on an individual basis as required. In other embodiments, a user is able to choose which applications are immediately important, leaving others disconnected. In still other embodiments, the operating system application may prioritize an application which has an active window in the device, for example the foremost application in a mobile phone. In one or more embodiments, the operating system application connects services as indicated by current rules until an application has completed transfer or the network status changes.

In an embodiment, when an application that is prioritized over other applications completes its data transfer, the application reports to the operating system application that queued transfer is complete for the application, and the operating system application presents a connected network interface to applications of the next lower network priority. In this manner eventually all applications that have their network connectivity not completely disabled are able to use the network. This may not occur if a higher priority application never reaches the stage of having all of its data transferred but in this case the application selected as more important will continue to receive exclusive network access.

Because the operating system application is able to query each application for the estimated amount of data to be transferred after a change in network conditions it is unlikely that the user would be queried enough so that such a feature would became annoying. However, in one or more embodiments a heuristic may be provided so that the list of choices is not presented, or an order of application importance may be established that is automatically applied rather than requesting the order from the user.

In one or more embodiments, within each application the operating system application displays an indicator indicating that an application is prevented from reaching the network by user preference. In such an embodiment, selecting the indicator by the user provides the user the opportunity to re-grant network permissions to the application. In particular embodiments, a system setting is provided to globally permit network connections to certain applications.

In addition to the benefits of choosing to allow any application considered more important by the user to monopolize a connection when it becomes available, one or more embodiments may provide a benefit of being able to detect and alert a user to abnormal usage. For example, if a user makes a mistake and initiates a download of a particularly large set of data, the operating system application may detect the transfer of data and offer the user the opportunity to terminate it. In the event of a service in which data is usually transferred at a fairly steady rate, such as social networking, the operating system application may detect the absence of data and alert the user to the possibility of a downed server or the need to sign in to a service. In this way the machine learning algorithm may function in a similar way to network monitoring tools.

An embodiment can be implemented as a software application. The application implementing an embodiment can be configured as a modification of an existing system or platform, as a separate application that operates in conjunction with an existing system or platform, a standalone application, or some combination thereof.

The illustrative embodiments are described with respect to certain types of tools and platforms, procedures and algorithms, services, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
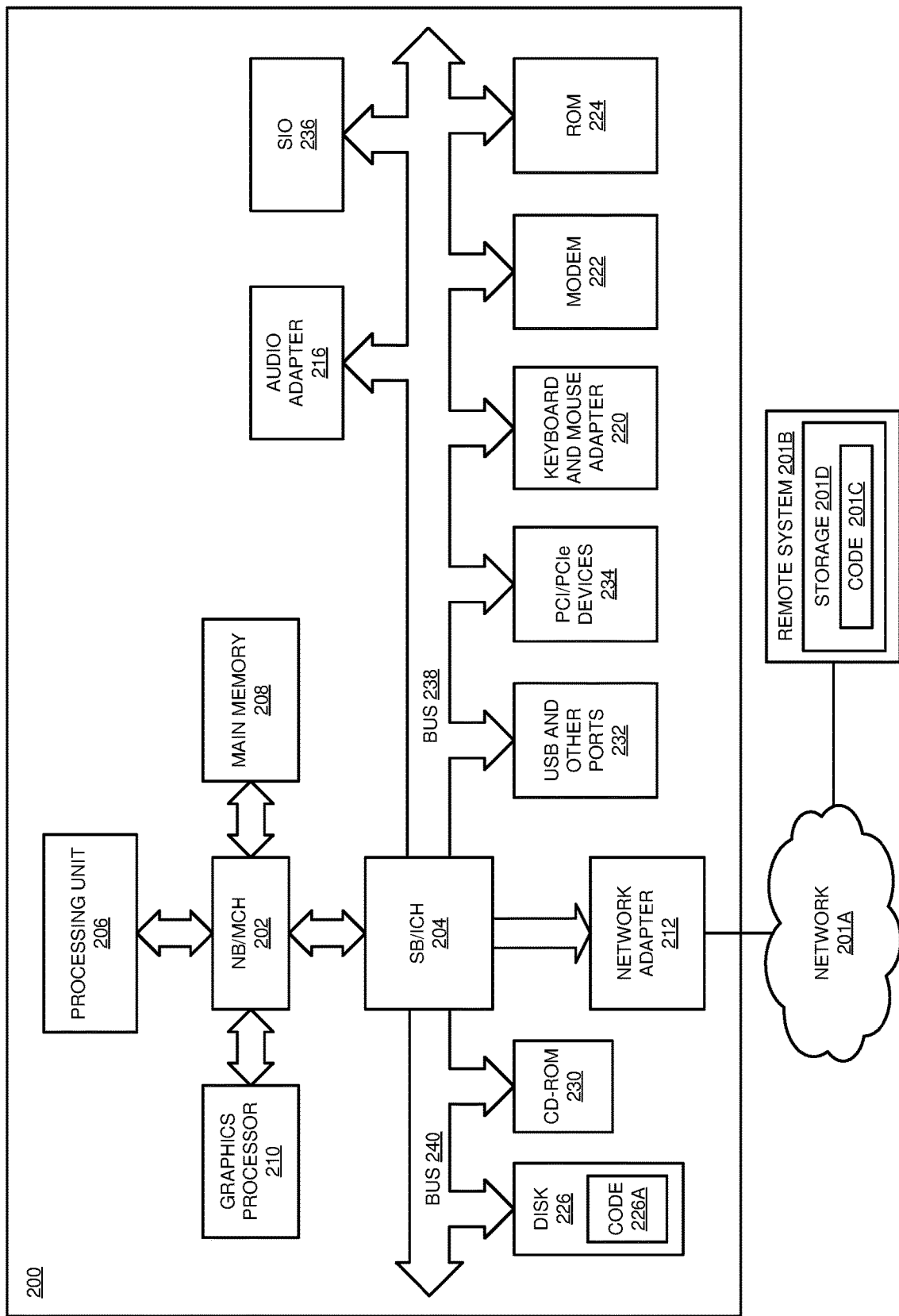
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner. Device 132 includes an application 134 that may be configured to implement one or more of the functions described herein for mitigating network saturation following periods of device disconnection and subsequent reconnection as described herein in accordance with one or more embodiments.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown. Storage unit 108 includes one or more databases 109 configured to store data such as user profile information associated with device 132.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 134 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
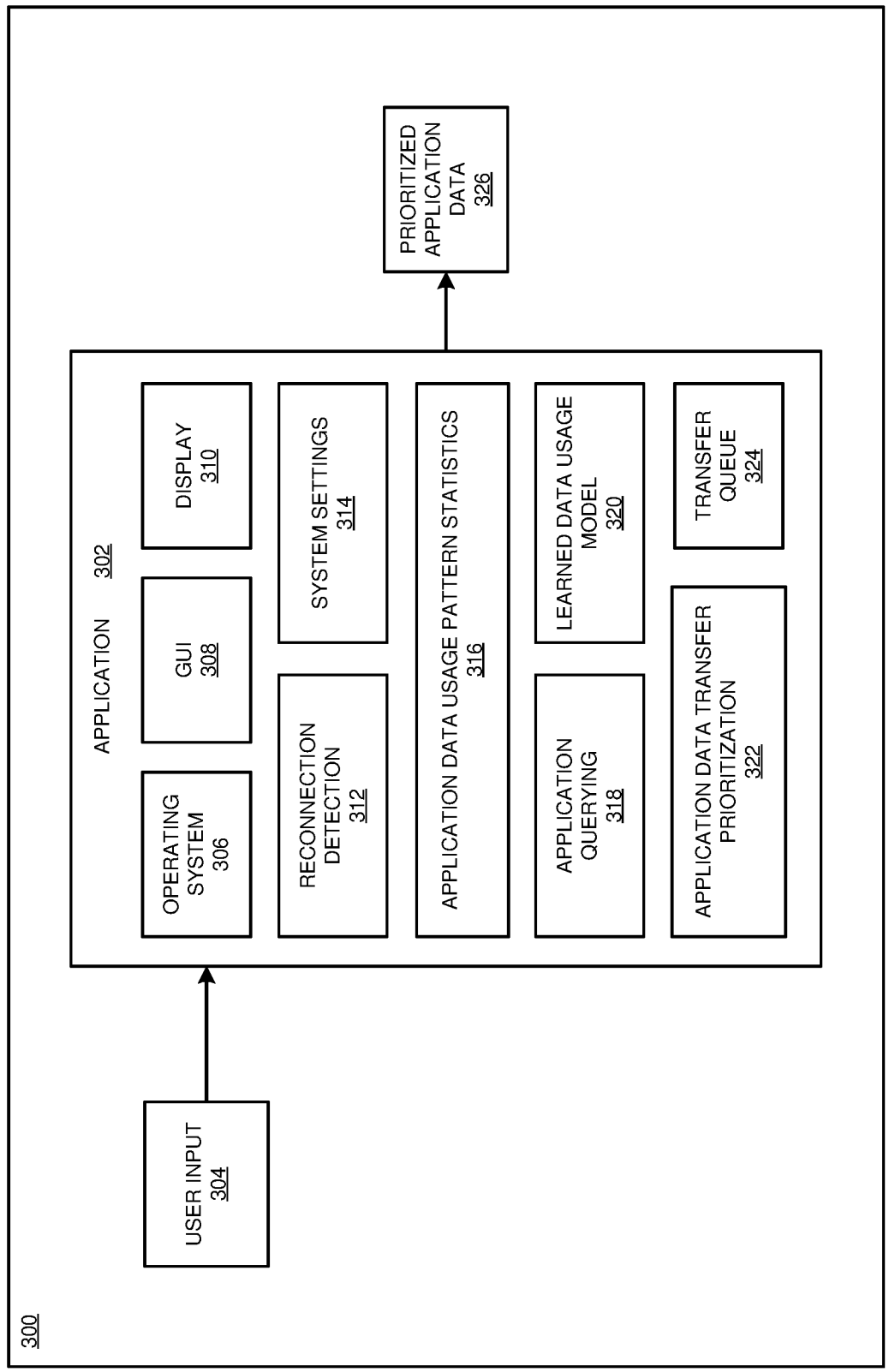
FIG. 3 depicts a block diagram of an example configuration for mitigating network saturation following periods of device disconnection and subsequent reconnection in accordance with an illustrative embodiment.

With reference to FIG. 3, this figure depicts a block diagram of an example configuration 300 for mitigating network saturation following periods of device disconnection and subsequent reconnection in accordance with an illustrative embodiment. The example embodiment includes an application 302. In a particular embodiment, application 302 is an example of application 134 of FIG. 1.

Application 302 receives user input 304 indicative of a user prioritization of applications executing on device 132 that have data waiting to transfer following a disconnection and subsequent reconnection of device 132 from a network connection. Application 302 includes an operating system 306, a graphical user interface (GUI) 308, a display 310, a reconnection detection component 312, a system settings component 314, an application data usage pattern statistics component 316, an application querying component 318, a learned data usage model 320, an application data transfer prioritization 322, and a transfer queue 324.

In the embodiment, operating system 306 is configured to perform operating system functions of device 132. GUI 308 is configured to provide a graphical user interface to a user of device 132 to perform operations such as selecting a priority of one or more applications for data transfer. Display 310 is configured to display information of the user of device 132 such as a list of applications to prioritize. Reconnection detection component 312 is configured to detect reconnection of device 132 to a connection to a network after a period of disconnection from the same or a different network. System settings component 314 is configured to store one or more system settings of operating system 306 such as default total expected data transfer volume threshold values.

Application data usage pattern statistics component 316 is configured to collect data usage statistics of one or more applications and determine usage patterns for each application indicative of an expected data usage pattern for the application. Application querying component 318 is configured to query one or more applications residing on device 132 and receive an estimated backlog of data to be transferred from the applications. Learned data usage model 320 is configured to model the data usage pattern using data usage pattern statistics received from application data usage pattern statistics component 316 and determine estimated data to be transferred for a particular application using machine learning. In one or more embodiments, learned data usage model 320 is continuously updated based upon the received data usage pattern statistics.

Applicant data transfer prioritization component 322 is configured to prioritize the applications waiting to transfer data and insert the prioritized application data into transfer queue 324. Transfer queue 324 is configured to outputs prioritize application data 326 according to the priorities.

Figure 4:
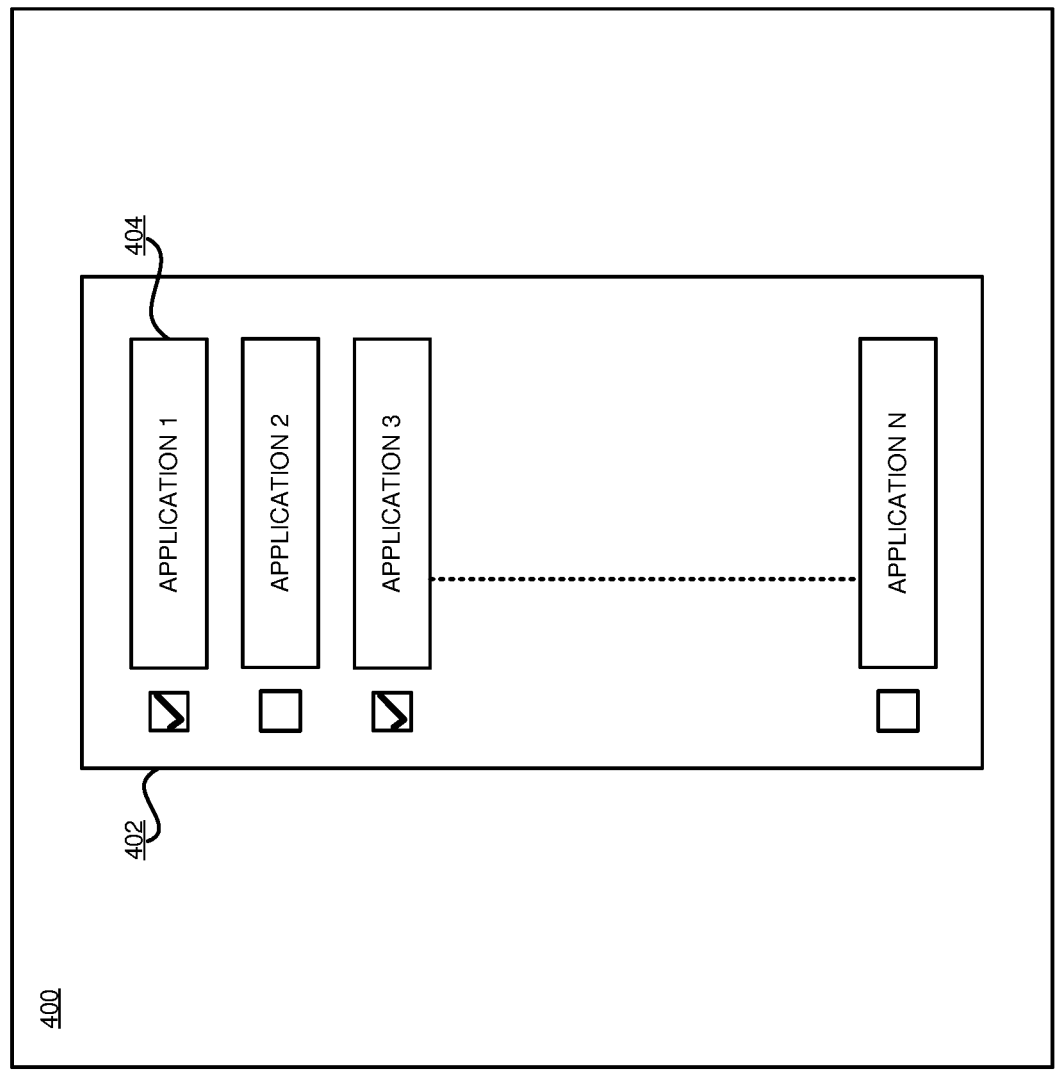
FIG. 4 depicts an embodiment of a graphical user interface in accordance with an illustrative embodiment.

With reference to FIG. 4, this figure depicts an embodiment of a graphical user interface (GUI) 400 of device 132 in accordance with an illustrative embodiment. GUI 400 includes an application list 402 of applications 404 including Application 1 to Applicant N waiting to transfer data after a disconnection and subsequent reconnection of device 132 to a network. GUI 400 includes a checkbox next to each application to allow a user to designate the particular application as being a priority for data transfer. In particular embodiments, GUI 400 further allows a user to arrange an order of each of applications 404 in application list 402 to indicate a preferred priority order in transferring backlogged data. Although the particular GUI 400 of FIG. 4 depicts a list of applications for allowing a user to select and prioritize backlogged data transfer, it should be understood that in other embodiments other arrangements of a GUI may be used such as an indication in an icon of the particular application.

Figure 5:
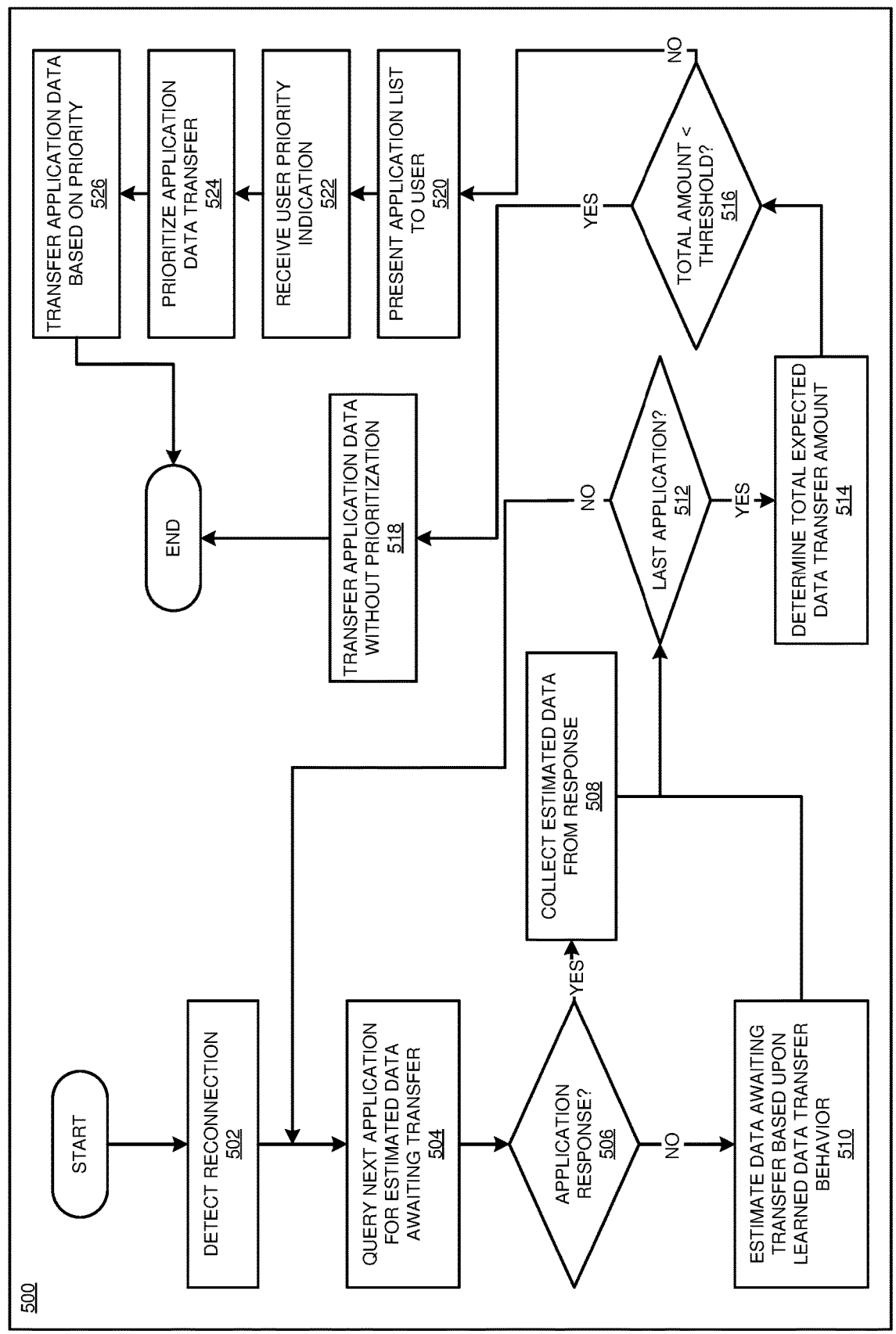
FIG. 5 depicts a flowchart of an example process for mitigating network saturation following periods of device disconnection and subsequent reconnection in accordance with an illustrative embodiment.

With reference to FIG. 5, this figure depicts a flowchart of an example process 500 for mitigating network saturation following periods of device disconnection and subsequent reconnection in accordance with an illustrative embodiment. In block 502, application 134 detects reconnection of device 132 to a network after a period of disconnection of device 132 from the same or a different network. In block 504, application 134 queries a next application of a set of applications residing on device 132 for estimated data associated with the application awaiting transfer. In block 506, application 134 determines whether a response has been received for the queried application. If a response has been received from the application, in block 508 application 134 collects an indication of an estimated data awaiting transfer for the application and process 500 continues to 512. If no response has been received from the queried application, process 500 continues to block 510. In block 510, application 134 estimates data awaiting transfer for the application based upon learned data transfer behavior for the queried application. In an embodiment, application 134 determines an estimate of the data awaiting transfer for the application using a learned data usage model configured to model a data usage pattern in which the model is previously trained using data usage pattern statistics for the application and process 500 continues to block 512.

In block 512, application 134 determines whether the last application in the set of applications has been queried. If the last application in the set of applications has not been queried, process 500 returns to block 504 in which the next application in the set of applications is queried for an estimated data awaiting transfer. If the last application in the set of applications has been queried, in block 514 application 134 determines a total expected data transfer amount by summing the estimated data awaiting transfer for each application.

In block 516, application 134 determines whether the total expected data transfer amount is less than a threshold value. In a particular embodiment, the threshold value is received form the user. In another particular embodiment, the threshold value is a default setting of application 134. If the total expected data transfer amount is less than the threshold value, in block 518 application 134 transfers the application data for each application without prioritization of the data transfer and process 500 ends. If the total expected data transfer amount is not less than the threshold value, in block 520 application 134 presents an application list to the user in a GUI including a list of one or more application for which data transfer is awaiting. In block 522, application 134 receives a user priority indication from the user indicating a desired priority for one or more of the applications. In block 524, application 134 prioritizes the application data transfer based upon the indicated priorities. In block 526, application 134 transfers the application data awaiting transfer based upon the priorities. Process 500 then ends.

Thus, a computer implemented method, system or apparatus, and computer program product are provided in the illustrative embodiments for mitigating network saturation following periods of device disconnection and subsequent reconnection and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   detecting, by one or more processors, reconnection of device to a network after a period of disconnection;
   querying, by one or more processors, a set of applications residing on the device for estimated data associated with the application awaiting transfer;
   determining, by one or more processors, that a response has been received from a first application of the set of applications, the response including a first estimated data awaiting transfer from the first application;
   determining, by one or more processors, that a response has not been received from a second application of the set of applications;
   determining, by one or more processors, responsive to determining that the response has not been received from the second application, a second estimated data awaiting transfer from the second application based upon a learned data usage model for the application, wherein the learned data usage model uses data usage pattern statistics to determine estimated data to be transferred from the second application using machine learning;
   determining, by one or more processors, a total expected data transfer amount based upon the first estimated data and the second estimated data;
   determining, by one or more processors, that the total expected data transfer amount is not less than a threshold value; and
   determining, by one or more processors, responsive to the determining that the total expected data transfer amount is not less than the threshold value, a priority of the data transfer for the first application and the second application.

2. The method of claim 1, further comprising:
   receiving, by one or more processors, a priority indication from a user of the device designating a priority for at least one of the first application or the second application.

3. The method of claim 2, wherein the determining of the priority of the data transfer for the first application and the second application is based upon the priority indication from the user.

4. The method of claim 1, further comprising:
   transferring, by one or more processors, the application data for the first application and the second application based upon the priority.

5. The method of claim 1, wherein the learned data usage model for the application is previously trained using data usage pattern statistics for the second application.

6. The method of claim 1, wherein the total expected data transfer amount is based upon a summation of the first estimated data and the second estimated data.

7. The method of claim 1, further comprising:
   presenting, by one or more processors, the set of applications to the user in a list within a graphical user interface, wherein the priority indication is received from the user via the graphical user interface.

8. The method of claim 1, wherein the threshold value is received form the user.

9. A computer usable program product comprising one or more computer-readable storage devices, and program instructions stored on at least one of the one or more storage devices, the stored program instructions comprising:
   program instructions to detect reconnection of device to a network after a period of disconnection;

program instructions to query a set of applications residing on the device for estimated data associated with the application awaiting transfer;

program instructions to determine that a response has been received from a first application of the set of applications, the response including a first estimated data awaiting transfer from the first application;

program instructions to determine that a response has not been received from a second application of the set of applications;

program instructions to determine, responsive to determining that the response has not been received from the second application, a second estimated data awaiting transfer from the second application based upon a learned data usage model for the application, wherein the learned data usage model uses data usage pattern statistics to determine estimated data to be transferred from the second application using machine learning;

program instructions to determine a total expected data transfer amount based upon the first estimated data and the second estimated data;

program instructions to determine that the total expected data transfer amount is not less than a threshold value; and program instructions to determine, responsive to the determining that the total expected data transfer amount is not less than the threshold value, a priority of the data transfer for the first application and the second application.

10. The computer usable program product of claim 9, further comprising:

program instructions to receive a priority indication from a user of the device designating a priority for at least one of the first application or the second application.

11. The computer usable program product of claim 10, wherein the determining of the priority of the data transfer for the first application and the second application is based upon the priority indication from the user.

12. The computer usable program product of claim 9, further comprising:

program instructions to transfer the application data for the first application and the second application based upon the priority.

13. The computer usable program product of claim 9, wherein the learned data usage model for the application is previously trained using data usage pattern statistics for the second application.

14. The computer usable program product of claim 9, wherein the total expected data transfer amount is based upon a summation of the first estimated data and the second estimated data.

15. The computer usable program product of claim 9, further comprising:

program instructions to present the set of applications to the user in a list within a graphical user interface, wherein the priority indication is received from the user via the graphical user interface.

16. The computer usable program product of claim 9, wherein the threshold value is received form the user.

17. The computer usable program product of claim 9, wherein the computer usable code is stored in a computer readable storage device in a data processing system, and wherein the computer usable code is transferred over a network from a remote data processing system.

18. The computer usable program product of claim 9, wherein the computer usable code is stored in a computer readable storage device in a server data processing system, and wherein the computer usable code is downloaded over a network to a remote data processing system for use in a computer readable storage device associated with the remote data processing system.

19. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to detect reconnection of device to a network after a period of disconnection;

program instructions to query a set of applications residing on the device for estimated data associated with the application awaiting transfer;

program instructions to determine that a response has been received from a first application of the set of applications, the response including a first estimated data awaiting transfer from the first application;

program instructions to determine that a response has not been received from a second application of the set of applications;

program instructions to determine, responsive to determining that the response has not been received from the second application, a second estimated data awaiting transfer from the second application based upon a learned data usage model for the application, wherein the learned data usage model uses data usage pattern statistics to determine estimated data to be transferred from the second application using machine learning;

program instructions to determine a total expected data transfer amount based upon the first estimated data and the second estimated data;

program instructions to determine that the total expected data transfer amount is not less than a threshold value; and program instructions to determine, responsive to the determining that the total expected data transfer amount is not less than the threshold value, a priority of the data transfer for the first application and the second application.

20. The computer system of claim 19, the stored program instructions further comprising:

program instructions to receive a priority indication from a user of the device designating a priority for at least one of the first application or the second application.

* * * * *